Patented Nov. 9, 1926.

1,606,319

UNITED STATES PATENT OFFICE.

CHARLES E. PARSONS, OF NEW YORK, N. Y., AND SAMUEL PEACOCK, OF WHEELING, WEST VIRGINIA, ASSIGNORS, BY MESNE ASSIGNMENTS, TO METAL RESEARCH CORPORATION, OF NEW YORK, N. Y., A CORPORATION OF DELAWARE.

PROCESS OF PRODUCING PHOSPHORUS PENTOXIDE.

No Drawing.    Application filed March 29, 1924.    Serial No. 702,964.

This invention relates to a process of producing phosphorus pentoxide, $P_2O_5$, in a shaft type of furnace, and has for its object to improve the procedures heretofore proposed.

With these and other objects in view, the invention consists in the novel steps and combinations of steps constituting the process all as will be more fully hereinafter disclosed, and particularly pointed out in the claims.

By this invention phosphorus pentoxide is produced by charging a blast furnace with a burden containing calcium phosphate, silica, coke, and a chloride of an alkali forming metal. The burden is then heated, the lower part of the furnace being maintained at a temperature sufficient to prevent the formation of silico-phosphoric acid, and the upper part of the furnace being maintained at a temperature to allow the chlorine and carbon monoxide liberated in the lower part of said furnace to combine to form carbonyl chloride.

In carrying out this invention it is believed that phosphoryl chloride $POCl_3$ is produced by the action of carbonyl chloride $COCl_2$ on tricalcium phosphate $Ca_3P_2O_8$. It is further believed that the phosphoryl chloride thus produced reacts with a second equivalent of phosphate, producing phosphorus pentoxide $P_2O_5$ and calcium chloride $CaCl_2$. Phosphate is employed in the form of commercial lime phosphate. The temperature suitable for the reaction at commercial velocity, is about 500° C. This reaction would be represented in equations, thus:—

(1) 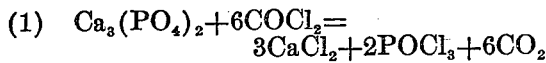
$$3CaCl_2 + 2POCl_3 + 6CO_2$$

(2) 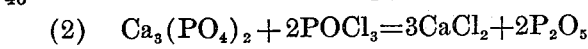

The carbonyl chloride may be produced by the interaction of a metal chloride and carbon monoxide CO at about 1400° C. Anhydrous calcium chloride in contact with white hot carbon and in the presence of carbon monoxide CO and in the absence of carbon dioxide $CO_2$, will react to form carbonyl chloride, substantially thus:—

Carbonyl chloride dissociates at about 700° C., and in the high temperature zone of the furnace, carbon monoxide and chlorine only are formed. As these gases rise in the furnace when they reach about 700° C., and are in contact with coke, they will combine to form carbonyl chloride.

A shaft furnace of the type used in smelting iron ore, is employed. The phosphate and coke, together with such calcium chloride as is found necessary to replace the process losses, assumed to be 20 percent, are charged into the furnace by means of a gas tight feeding device. Sodium chloride may be substituted for the calcium chloride, in the process loss replacement. In the high temperature zone of the furnace chlorine and carbon monoxide are formed which, rising through the furnace burden combine at about 700° C. to form $COCl_2$ which decomposes the phosphate. The phosphoric oxide will then pass out of the furnace with the combustion gases, and the calcium chloride will be condensed upon the relatively cold furnace burden and is carried down with the descending charge, until its chlorine is again liberated and becomes active.

It is desirable, though not essential, to provide sufficient silica in the furnace burden to flux the lime to a fusible calcium silicate, which passes out of the furnace as molten slag. Due to the action of the carbonyl chloride, all the alumina in the furnace burden will pass out of the furnace with the combustion and reaction gases, and the lime silicate slag being free of alumina, is highly desirable as a raw material in glass and cement making. The iron oxide in the furnace burden, is reduced to metallic iron in the upper part of the furnace, passes out of the furnace with the slag as "shot" iron, and may be removed from such slag by means of ordinary magnetic separation. In other words, if it is desirable to use the lime silicate slag for glass or cement making, the slag will be ground to approximately 60 mesh in an air swept tube mill and the fine product will be carried from the settling chamber, where the air and slag are separated by means of a belt conveyor at the end of which is located a magnetic pulley for separating the iron from the slag. Such pulleys are in common use for similar purposes and are very effective.

In the high temperature zone of the furnace, calcium chloride in contact with white hot coke, carbon monoxide and silica, reacts substantially as follows:—

$$CaCl_2 + SiO_2 + 2CO = CaSiO_3 + CO + Cl_2 + C$$

The lime silicate represented by the $CaSiO_3$ produced, melts and forms slag. The carbon monoxide and chlorine rise with the combustion gases, and in the upper part of the furnace, changes to $COCl_2$ which attacks the lime phosphate thus:

$$Ca_3P_2O_8 + 3COCl_2 = 2POCl_3 + 3CaO + 3CO_2.$$

The temperature being above 500° C., phosphoryl chloride reacts with calcium oxide, thus:—

$$2POCl_3 + 3CaO = P_2O_5 + 3CaCl_2.$$

The procedure may be more simply stated as follows:—

$$Ca_3(PO_4)_2 + 3COCl_2 = 3CaCl_2 + P_2O_5 + 3CO^2.$$

The essential feature of the process is that phosphoric oxide $P_2O_5$ in a free state never contacts with silica at a temperature above approximately 600° C., and hence no silicophosphoric acid is produced. The phosphoric oxide, even in combined form, does not penetrate to the high temperature zone of the furnace, having been volatilized in the upper part of the shaft, and therefore a lime-phosphate glass cannot form. By this means a very high return of phosphoric oxide, from 96 to 98 percent, is gained industrially, which is a necessary condition to commercial success in any operation producing a product of comparatively low commercial value.

It will now be clear that by providing a furnace charge or burden properly proportioned to effect the reactions above stated in an ordinary iron blast furnace containing coke, phosphate rock, calcium chloride, or sodium chloride, or both, in a quantity of say 20% in excess of that theoretically required, and also containing preferably sufficient silica to flux all the combined calcium present, one may produce in said furnace from the reaction of the carbon monoxide present on the calcium, or sodium chloride in the charge, considerable quantities of carbonyl chloride, and that said carbonyl chloride will react with a part of the calcium phosphate present to produce phosphoryl chloride and that the latter will react on another portion of the calcium phosphate present in the charge to produce the desired phosphorus pentoxide, $P_2O_5$, which escapes with the furnace gases and may be recovered therefrom by any suitable and well known means.

What is claimed is:—

1. The process of producing phosphorus pentoxide in a blast furnace which consists in charging said furnace with a burden containing calcium phosphate, silica, coke and a chloride of an alkali forming metal to form the desired phosphorus pentoxide.

2. The process of producing phosphorus pentoxide which consists in charging a blast furnace with a burden containing calcium phosphate, silica, coke and a chloride of an alkali forming metal; raising the temperature of said burden to substantially 1400° C. in the lower part of said furnace; and reacting upon the said calcium phosphate with the gases formed to produce the desired phosphorus pentoxide.

3. The process of producing phosphorus pentoxide in a blast furnace which consists in providing a charge containing calcium phosphate, silica, coke and a chloride of an alkali forming metal; maintaining a temperature of substantially 1400° C. in the lower part of said furnace; volatilizing the phosphoric oxide in the upper part of said furnace; and recovering the latter.

In testimony whereof we affix our signatures.

CHARLES E. PARSONS.
SAMUEL PEACOCK.